A. W. MEDHURST.
PEDAL CONTROL MECHANISM FOR MOTOR VEHICLES.
APPLICATION FILED JUNE 1, 1914.
1,201,487.
Patented Oct. 17, 1916.
3 SHEETS—SHEET 1.
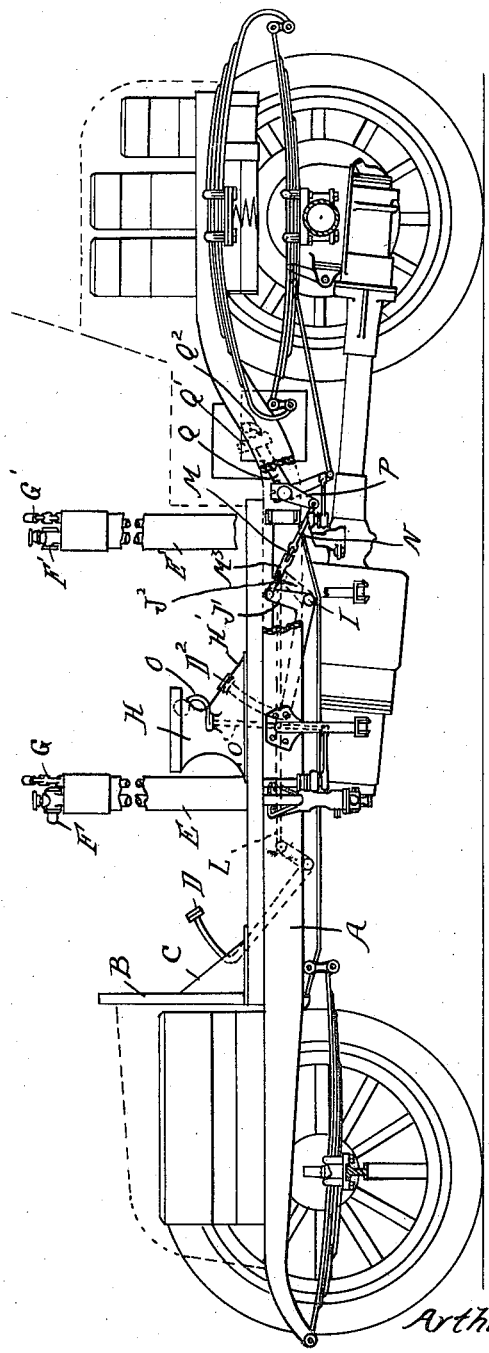
WITNESSES:
W. K. Ford
James P. Barry
INVENTOR.
Arthur W. Medhurst
BY
Whittemore Hulbert & Whittemore
ATTORNEYS

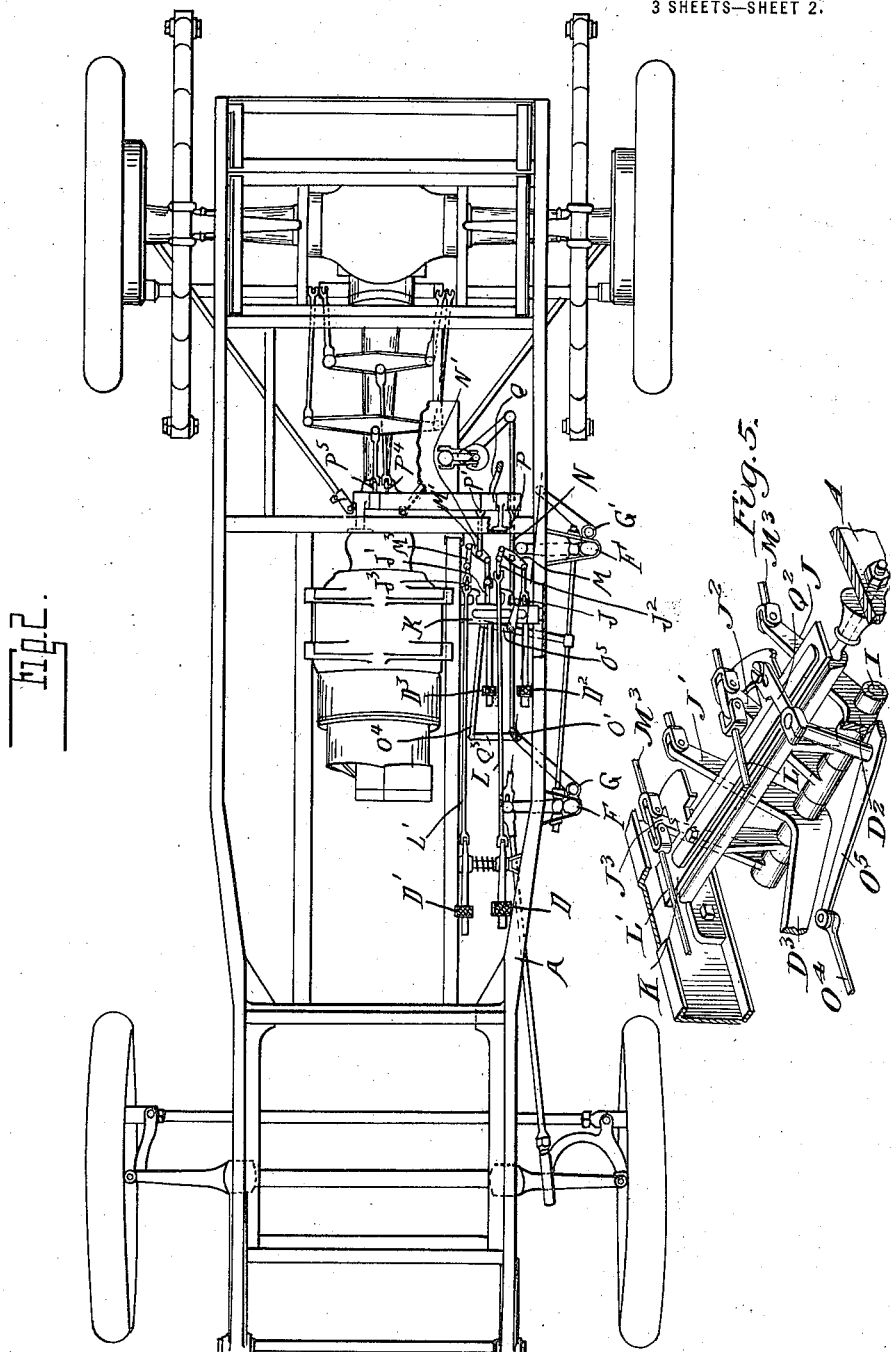

A. W. MEDHURST.
PEDAL CONTROL MECHANISM FOR MOTOR VEHICLES.
APPLICATION FILED JUNE 1, 1914.
1,201,487.
Patented Oct. 17, 1916.
3 SHEETS—SHEET 3.
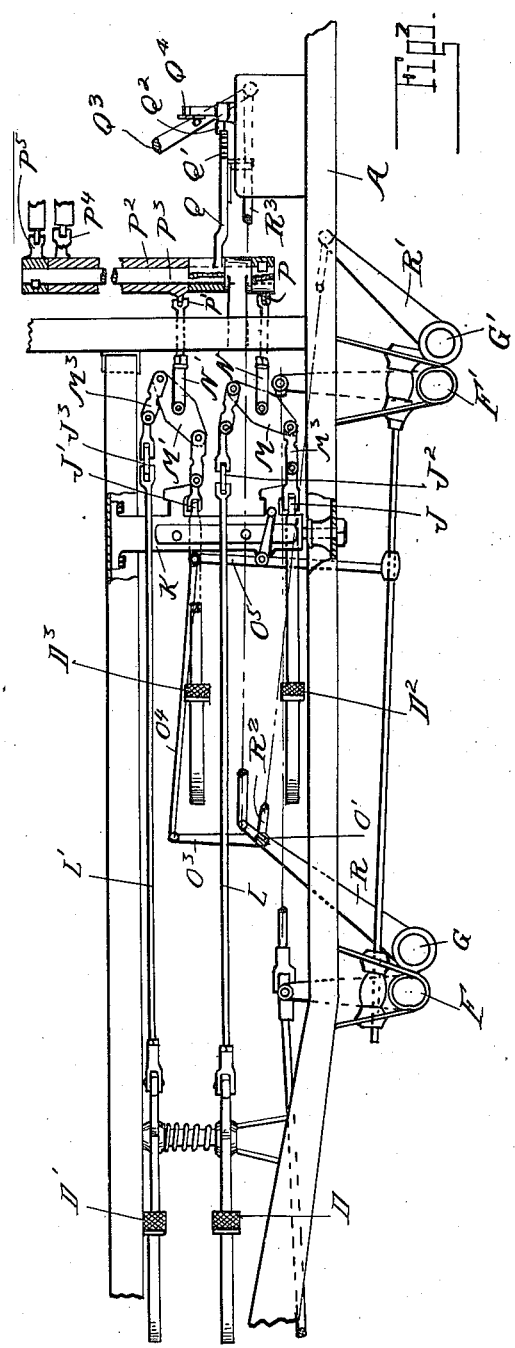
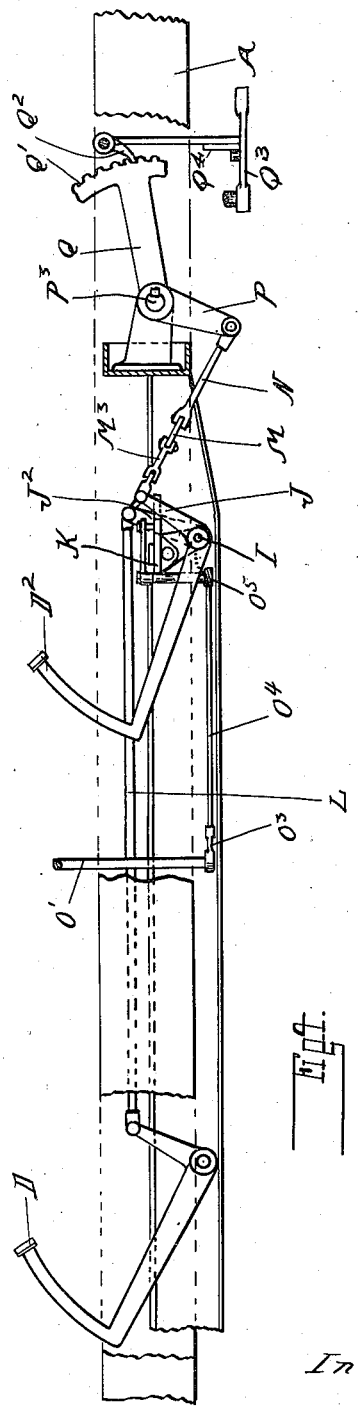
Witnesses
W. K. Ford
James P. Barry
Inventor
Arthur W. Medhurst
By Whittemore Hulbert + Whittemore
Attys

UNITED STATES PATENT OFFICE.

ARTHUR W. MEDHURST, OF DETROIT, MICHIGAN, ASSIGNOR TO ANDERSON ELECTRIC CAR COMPANY, OF DETROIT, MICHIGAN, A CORPORATION OF MICHIGAN.

PEDAL-CONTROL MECHANISM FOR MOTOR-VEHICLES.

1,201,487.   Specification of Letters Patent.   Patented Oct. 17, 1916.

Application filed June 1, 1914. Serial No. 842,305.

*To all whom it may concern:*

Be it known that I, ARTHUR W. MEDHURST, a subject of the King of Great Britain and Ireland, residing at Detroit, in the county of Wayne and State of Michigan, have invented certain new and useful Improvements in Pedal-Control Mechanism for Motor-Vehicles, of which the following is a specification, reference being had therein to the accompanying drawings.

The invention relates to brake mechanism for motor vehicles and has for its particular object the obtaining of a construction in which the brakes may be operated alternatively from different positions in the vehicle.

It is a further object to obtain a construction in which interference is prevented; further to provide an interlocking mechanism between the brake control and motor control; and still further, to obtain a convenient arrangement of the parts so as to avoid obstruction in the car.

In the drawings: Figure 1 is a side elevation; and Fig. 2 is a plan view; Fig. 3 is a detail plan view of the lever mechanism; and Fig. 4 is a longitudinal section therethrough. Fig. 5 is a detail perspective view of the mechanism for alternatively locking the pedals.

A is the vehicle frame, B the dash, C the inclined toe-board adjacent to the dash and D and D' pedals extending through said toe-board and controlling respectively the service and emergency brake mechanisms. E is a mast upon which are mounted the steering lever F and motor-control lever G used by the operator when in the forward seat of the vehicle, and E' F' and G' are corresponding parts of a duplicate control mechanism operable from the rear seat of the vehicle.

To provide a brake-control when the vehicle is driven from the rear seat a second pair of pedals $D^2$ and $D^3$ are arranged in the proper position and are connected to the respective brake mechanisms. It is desirable to locate these pedals so as to avoid obstruction in the car, and this I have accomplished by associating them with a stand or pedestal H which supports the forward seat. This stand is formed with an inclined portion H' forming a second toe-board which is slotted for the passage of the pedals therethrough. The arrangement is also such that when the pedals $D^2$ and $D^3$ are not in use they may be depressed into recesses in the toe-board so as to avoid obstructing the floor space of the car, and the same is true of the forward pedals D and D'.

The duplicate pedals are connected to each other and to the brake mechanism in such a manner that the brakes may be controlled alternatively by either pedal, but when one pedal is in control the other will be inoperative. This is preferably accomplished by mechanism of the following construction: I is a shaft mounted on the frame upon which the rear pedals $D^2$ and $D^3$ are fulcrumed. These pedals are provided with upwardly-extending bell-crank arms J and J', and adjacent to these and fulcrumed upon the same shaft I are rock-arms $J^2$ and $J^3$. K is a laterally slidable locking plate mounted upon the frame and notched to alternatively engage the bell-crank arms J and J' of the pedals $D^2$ and $D^3$ and rock-arms $J^2$ and $J^3$. L and L' are rods respectively connecting the pedals D and D' with the rock-arms $J^2$ and $J^3$. M and M' are even levers respectively connecting the rock arms J $J^2$ and J' $J^3$, through the medium of jointed links $M^3$, and N N' are rods respectively centrally connected with the even-levers M and M' and constituting the pull-rods for the brake mechanism. The arrangement just described is such that either the forward or the rear pedals may be locked in stationary position by suitable adjustment of the locking plate K, and when one set of pedals are thus locked the actuation of the other pedals will cause the pulling of the rods N and N' and the actuation of the brakes thereby. Thus where the rear pedals are locked by engagement of the plate K with the bell-crank arms J and J' the actuation of the forward pedal D will cause the rocking of the even-lever M and the pulling of the rod N, while the actuation of the pedal D' will cause the rocking of the even-lever M' and pulling of the rod N'. In the same manner if the plate K is adjusted to lock the rock-arms $J^2$ and $J^3$, this will hold said arms from movement and also will hold the forward pedals D and D' in a depressed position in the toe-board C, while the rear pedals $D^2$ and $D^3$ will be free for operation to rock the even-levers M and M". The effect on the brakes will be the same whichever pedals are used, but only one set can be used at the same time.

For shifting the locking plate K an operating lever is provided which is preferably mounted upon the stand H, and this lever O is secured to a vertical rock-shaft O' which at its lower end is connected to a crank-arm O³, which in turn is connected by a link O⁴ with a bell-crank lever O⁵ having one arm connected to the plate K. By adjustment of this lever O the plate K may be shifted and thus either set of pedals may be locked or freed at will.

The pull-rods N and N' are connected to the brakes through any suitable intermediate mechanism, but, as shown, they are attached to rock-arms P and P' on rock-shafts P² and P³, which are telescopically engaged and pivotally mounted upon the frame. These rock-shafts in turn are provided with rock-arms P⁴ and P⁵ which lead to the brake mechanism (not shown), while the rock-shaft P³ is provided with an arm Q having a ratchet segment Q' engaged by a spring-pressed dog Q². Thus whenever the emergency brake is set, the engagement of the dog Q² with the ratchet segment Q' will hold the brake in set position, but this will not interfere with the shifting of the pedals by adjustment of the locking plate K and consequently if the operator wishes to change his position of control from forward to rear or vice versa, he can do so without releasing the brakes.

For effecting release of the ratchet segment Q' from the dog Q², the operative control lever G or G' is employed in conjunction with the operative emergency foot pedal. The control levers G and G' respectively are arranged to actuate rock arms R and R' below the masts. Said rock arms are connected by a rod R² so as to swing always in unison. From one of said arms a rod R³ extends rearwardly to a rock arm Q³ for operating the control switch, (not shown). In one position of the rock arm Q³, said arm bears against a spring arm Q⁴ which is connected with the dog Q² and is adapted to exert sufficient tension thereupon to withdraw the same from said segment whenever a slight pressure is placed upon the operative emergency pedal lever, thereby releasing the brakes from their set position.

I claim:

1. A vehicle control mechanism, comprising a front and a rear pedal, a connection between the pedals established through an evener lever, a draw-rod connecting with the evener lever to transmit the control from either pedal, and a locking means for establishing either extremity of the evener lever as a fulcrum, the draw-rod being actuable by the respective pedals, according as the extremities of the evener lever respectively form fulcrums.

2. A vehicle control mechanism, comprising a front and a rear pedal, a rock arm adjacent to the rear pedal, a draw-rod connecting the front pedal with said rock arm, a connection between the rear pedal and said rock arm, established through an evener lever, a draw-rod connecting with the evener lever to transmit the control from either pedal, and a locking slide for establishing either extremity of the evener lever as a fulcrum, the draw-rod being actuable from the respective pedals, according as the extremities of the evener lever respectively form fulcrums.

3. A vehicle control mechanism comprising a front and a rear pedal, a connection between the pedals established through an evener lever, a draw-rod connecting with the evener lever, a brake mechanism actuable through said draw-rod, means for locking the brake mechanism, and means for establishing either extremity of the evener lever as a fulcrum, the brake mechanism being actuable by the respective pedals, according as the extremities of the evener lever respectively form fulcrums.

4. A vehicle control mechanism, comprising duplicate pedals, a mechanism alternatively operable from said pedals, a connection transmitting control to said mechanism from the pedals, and a locking mechanism associated with said connection, adjustable to alternatively render one of the pedals operable and the other inoperative.

5. A vehicle control mechanism, comprising duplicate pairs of pedals, each pair formed of a front and a rear pedal, mechanisms respectively alternatively actuable by the pedals of the respective pairs, an evener connection between the pedals of each pair and the mechanism controlled thereby, and a locking means adjustable to alternatively affect the front or the rear pedals.

6. A vehicle control mechanism, comprising duplicate pairs of pedals, each pair formed by a front and a rear pedal, mechanisms respectively alternatively operable by the pedals of the respective pairs, a connection between the pedals of each pair including a draw-rod and an evener lever, a draw-rod connecting with each evener lever and transmitting control from either of the pedals connected through said lever to the mechanism operable from said pedals, and a locking means, adjustable to affect either both front or both rear pedals.

7. A vehicle control mechanism, comprising duplicate pairs of pedals, each pair formed by a front and a rear pedal, an evener connection between the pedals of each pair including a rock arm, the two rock arms having a common axis, and a locking slide engaging the rock arms in one limiting position and the rear pedals in the other.

8. A vehicle control mechanism, comprising duplicate pairs of pedals, each pair formed by a front and a rear pedal, an evener connection between the pedals of each pair including a rock arm, and a locking member formed with two pairs of slots, one pair respectively engaging the two rock arms in one limiting position of the member, and the other pair respectively engaging the rear pedals in the other limiting position of said member, the front pedals having control when the rear ones are locked, and the rear ones having control when the rock arms are locked.

9. In a vehicle control mechanism, duplicate front and rear pedals alternatively adjustable into operative and inoperative positions, a brake adapted to be set by either pedal, and means permitting the adjustment of said pedals into reverse positions without releasing the brake.

10. A vehicle control mechanism, comprising a front and a rear pedal, a mechanism alternatively controlled by said pedals, a control transmission connection between the pedals and the mechanism actuable therefrom, an adjustable locking member associated with said connection for limiting control to either pedal, according to the limiting position in which it is adjusted, and means for actuating the locking member between its limiting positions.

11. In a motor vehicle control mechanism, duplicate pedals, and a toe-board for the rear pedal formed on the stand of the seat for the forward pedal.

12. In a motor vehicle control mechanism, duplicate pedals for controlling the same mechanism, a stand for the seat adjacent to the forward pedal forming a toe-board for the rear pedal, means for alternatively locking said pedals, and an actuating member for said locking means mounted on said seat stand.

13. In a motor vehicle control mechanism, forward and rear pedals, a common mechanism actuated thereby, a stand for the seat adjacent to the forward pedal having an inclined slotted portion forming the toe-board for the rear pedal, means for alternatively locking said pedals, a lever mounted on said seat stand, and a connection between said lever and said locking mechanism.

14. In a motor vehicle control mechanism, duplicate forward and rear pedals, recessed toe-boards for said pedals, and a connection between said pedals permitting of the depression and locking of one of said pedals in the recess of its toe-board when the other pedal is in operative position.

15. In a motor vehicle control mechanism, duplicate forward and rear pedals, recessed toe-boards adjacent thereto, a connection between said pedals permitting the alternative adjustment of the same from a position for operation into a position depressed into the recess of said toe-board, means for locking the depressed pedal, and mechanism to be controlled operable by the other pedal.

16. A vehicle control mechanism, comprising duplicate pedals, transmission mechanisms respectively connected to said pedals, a part common to the two transmission mechanisms, a mechanism actuable through said part by the two pedals alternatively, and a locking member respectively engaging the two transmission mechanisms in their limiting positions.

In testimony whereof I affix my signature in presence of two witnesses.

ARTHUR W. MEDHURST.

Witnesses:
  JAMES P. BARRY,
  PHILLIS COBURN.